United States Patent
Adams et al.

(10) Patent No.: US 9,168,880 B2
(45) Date of Patent: Oct. 27, 2015

(54) PANEL ASSEMBLY HAVING MULTI-LAYER PATCH FOR SOUND DAMPING

(75) Inventors: Michael C. Adams, Rochester, MI (US); Jonathan W. Fisk, Canton, MI (US); James F. Keys, Northville, MI (US)

(73) Assignee: Shiloh Industries, Inc., Valley City, OH (US)

( * ) Notice: Subject to any disclaimer, the term of this patent is extended or adjusted under 35 U.S.C. 154(b) by 0 days.

(21) Appl. No.: 14/006,577

(22) PCT Filed: Mar. 22, 2012

(86) PCT No.: PCT/US2012/030093
§ 371 (c)(1),
(2), (4) Date: Feb. 14, 2014

(87) PCT Pub. No.: WO2012/129386
PCT Pub. Date: Sep. 27, 2012

(65) Prior Publication Data
US 2014/0182966 A1 Jul. 3, 2014

Related U.S. Application Data (60) Provisional application No. 61/466,209, filed on Mar. 22, 2011.

(51) Int. Cl.
*F16F 15/04* (2006.01)
*B60R 13/08* (2006.01)
(Continued)

(52) U.S. Cl.
CPC .............. *B60R 13/08* (2013.01); *G10K 11/168* (2013.01); *B29C 53/60* (2013.01); *Y10T 29/49906* (2015.01)

(58) Field of Classification Search
USPC ......... 181/290, 294, 295, 296, 286, 284, 207, 181/208, 205; 296/39.3
See application file for complete search history.

(56) References Cited

U.S. PATENT DOCUMENTS 1,443,545 A * 1/1923 Lord ............................... 267/47
3,160,549 A * 12/1964 Caldwell et al. ............ 428/317.3
(Continued)

FOREIGN PATENT DOCUMENTS

DE    3113268 A1 * 10/1982
DE    4141343 A1 *  5/1993 ................ B32B 7/02
(Continued)

OTHER PUBLICATIONS

Written Opinion & International Search Report for PCT/US2012/030093, Oct. 25, 2012, 6 pages.
(Continued)

*Primary Examiner* — Edgardo San Martin
(74) *Attorney, Agent, or Firm* — Reising Ethington P.C.

(57) ABSTRACT

A panel assembly with a multi-layer patch may be used in any number of different applications in order to reduce noise or vibrations, provide thermal insulation, and/or improve the structural integrity of an underlying part. In an exemplary embodiment where the panel assembly is a vehicle part, the panel assembly includes a main panel, a primary adhesive layer, and a multi-layer patch that includes at least two individual patches and at least one auxiliary adhesive layer. The primary adhesive layer attaches the multi-layer patch to the main panel, and the auxiliary adhesive layer attaches the individual patches together. The size, shape, thickness and/or composition of the different layers of the multi-layer patch may be specifically chosen to exhibit certain sound and/or thermal damping properties.

22 Claims, 4 Drawing Sheets

(51) Int. Cl.
  *G10K 11/168* (2006.01)
  *F16F 15/00* (2006.01)
  *B29C 53/60* (2006.01)

(56) References Cited

U.S. PATENT DOCUMENTS

| | | | | |
|---|---|---|---|---|
| 3,648,828 | A * | 3/1972 | McCaffrey et al. | 198/763 |
| 3,817,356 | A * | 6/1974 | Dahlquist | 188/268 |
| 4,190,131 | A * | 2/1980 | Robinson | 181/296 |
| 4,223,073 | A * | 9/1980 | Caldwell et al. | 428/422 |
| 4,273,207 | A * | 6/1981 | Sivers et al. | 180/380 |
| 4,346,782 | A * | 8/1982 | Bohm | 181/207 |
| 4,373,608 | A * | 2/1983 | Holmes | 181/202 |
| 4,516,658 | A * | 5/1985 | Scarton et al. | 181/208 |
| 4,734,323 | A * | 3/1988 | Sato et al. | 428/317.3 |
| 4,778,028 | A * | 10/1988 | Staley | 181/208 |
| 4,851,271 | A | 7/1989 | Moore, III et al. | |
| 5,528,005 | A * | 6/1996 | Bschorr et al. | 181/208 |
| 5,631,451 | A * | 5/1997 | Torisaka et al. | 181/207 |
| 5,895,013 | A * | 4/1999 | Towfiq | 244/119 |
| 5,895,538 | A * | 4/1999 | Hatayama et al. | 156/87 |
| 6,177,173 | B1 * | 1/2001 | Nelson | 428/137 |
| 6,536,555 | B1 * | 3/2003 | Kelsic et al. | 181/207 |
| 6,591,434 | B1 | 7/2003 | De Cleene et al. | |
| 7,070,848 | B2 * | 7/2006 | Campbell | 428/137 |
| 7,094,478 | B1 * | 8/2006 | Griffey et al. | 428/692.1 |
| 7,748,184 | B1 * | 7/2010 | Wheeler et al. | 52/309.1 |
| 7,784,165 | B2 * | 8/2010 | Xiao et al. | 29/447 |
| 7,799,840 | B2 * | 9/2010 | Wheeler et al. | 521/83 |
| 8,403,390 | B2 * | 3/2013 | Rich et al. | 296/29 |
| 8,479,876 | B2 * | 7/2013 | Fetsko et al. | 181/207 |
| 2004/0214008 | A1 * | 10/2004 | Dobrusky et al. | 428/421 |
| 2005/0200059 | A1 | 9/2005 | Smith et al. | |
| 2005/0217933 | A1 * | 10/2005 | Sung Young et al. | 181/290 |
| 2009/0183821 | A1 * | 7/2009 | Schroeder et al. | 156/242 |
| 2011/0315473 | A1 | 12/2011 | Fetsko | |

FOREIGN PATENT DOCUMENTS

| | | |
|---|---|---|
| JP | 1206033 A | 8/1989 |
| JP | H04067945 | 3/1992 |
| JP | H06510703 | 12/1994 |
| JP | 8132241 A | 5/1996 |

OTHER PUBLICATIONS

Japanese Office Action dated Dec. 2, 2014, 6 pages.
English Translation of Japanese Office Action dated Dec. 2, 2014, 6 pages.
Korean Office Action and English Translation dated Feb. 4, 2015, 14 pages.

\* cited by examiner

PANEL ASSEMBLY HAVING MULTI-LAYER PATCH FOR SOUND DAMPING

RELATED APPLICATIONS

This application claims the benefit of U.S. Provisional Ser. No. 61/466,209 filed on Mar. 22, 2011. The entire contents of which are incorporated herein by reference.

FIELD

The present disclosure generally relates to structures for reducing noise and/or vibrations and, more particularly, to a multi-layer patch for selective sound damping of particular areas of a metal part, such as the type found in a vehicle.

BACKGROUND

Sound damping materials have been used in a variety of applications and industries, including the automotive industry. Oftentimes, articles that have been damped for sound include some type of viscoelastic material applied to a vibratory article, such as an automotive oil pan. The viscoelastic material absorbs and dissipates the vibrational energy generated by the article by converting mechanical energy associated with the vibrations into thermal energy that is dispersed within the sound damping material layer, and thus reduces the noise associated therewith. There are several different structures commonly used for sound damping purposes, including: free-layer structures, constrained-layer structures and laminates.

Free-layer structures are structures where a sound damping viscoelastic material by itself is applied to the surface of a vibratory article. In such an arrangement, vibratory or acoustical energy created by a noise or vibration source on one side of the article is dissipated in the adjacent viscoelastic layer so that it is not transmitted to the other side of the structure. In the case of constrained-layer structures, the sound damping viscoelastic material acts as an adhesive and is sandwiched between the vibratory article and an additional rigid constraining layer. The vibration damping is generally due to relative movement between the vibratory article and the rigid constraining layer which causes a shearing movement in the viscoelastic material. The shearing movement translates the vibrational energy into heat energy which is then dissipated through the rigid constraining layers. Sound damping laminates generally perform much in the same way as constrained-layer structures, however the vibratory article includes a pair of thin constraining layers and a viscoelastic material.

SUMMARY

According to one aspect, there is provided a panel assembly that comprises: a main panel having an acoustically active region; a primary adhesive layer; and a multi-layer patch having at least two individual patches and at least one auxiliary adhesive layer. The primary adhesive layer attaches the multi-layer patch to the main panel at the acoustically active region for sound damping.

According to another aspect, there is provided a method of making a panel assembly that comprises the steps of: (a) providing a main panel, a first individual patch, and a second individual patch; (b) attaching the first individual patch to the main panel via a primary adhesive layer and attaching the second individual patch to the first individual patch via an auxiliary adhesive layer so that a pre-formed panel assembly is formed; and (c) subjecting the pre-formed panel assembly to a metal forming operation so that a post-formed panel assembly is formed.

DRAWINGS

A preferred exemplary embodiment of the invention will hereinafter be described in conjunction with the appended drawings, wherein like designations denote like elements, and wherein.

DESCRIPTION

The multi-layer patches described herein may be used in any number of different applications in order to reduce noise or vibrations, provide thermal insulation, and/or improve the structural integrity of an underlying part. Although the multi-layer patches are described below in the context of panels for use in various vehicle applications, it should be appreciated that they are not so limited and may be used with non-vehicle applications as well. Some examples of potential vehicle applications include wheel wells, seat tubs, spare wheel tubs, dash panels, plenums, cowls, roof panels, floor pans, hoods, deck lids, door inners, parcel shelves, oil pans, covers and housings for various engine and transmission components, as well as other vehicle applications. Some potential non-vehicle examples include aerospace applications, marine applications, military applications, farm and construction equipment, home appliances, as well as any other application where it is desirable to reduce noise or vibrations in a stiff or rigid part.

Some non-limiting examples of panel assemblies and sound-damping patches that may be used in conjunction with the panel assembly taught herein are disclosed in International Patent Application Nos. PCT/US2010/045172, filed Aug. 11, 2010; PCT/US2010/053589, filed Oct. 21, 2010; and PCT/US2011/025361, filed Feb. 18, 2011; and PCT/US2011/039939, filed Jun. 10, 2011, the contents of which are all incorporated herein by reference.

Figure 1:
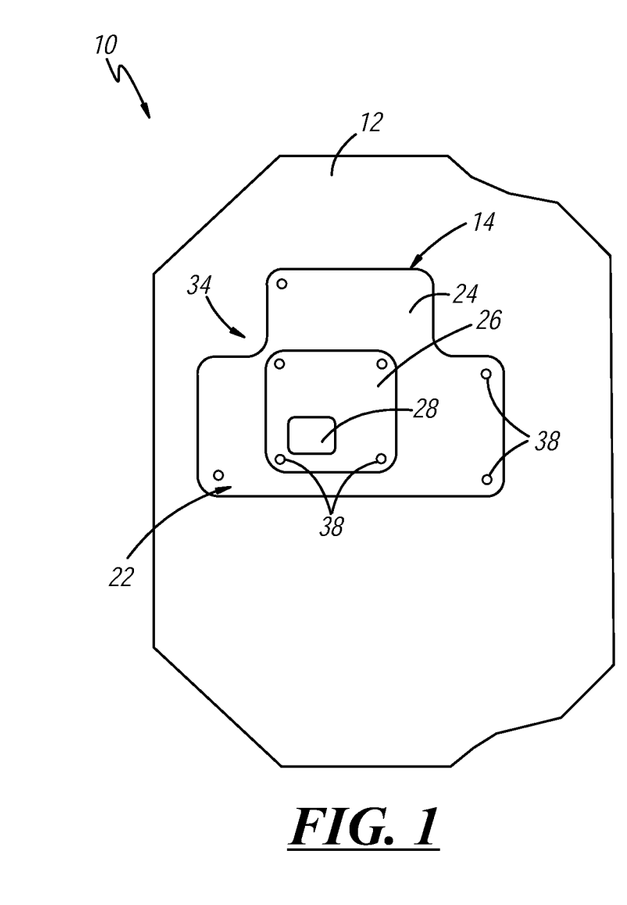
FIG. 1 is a top view of an exemplary panel assembly that includes a multi-layer patch.
Figure 2:
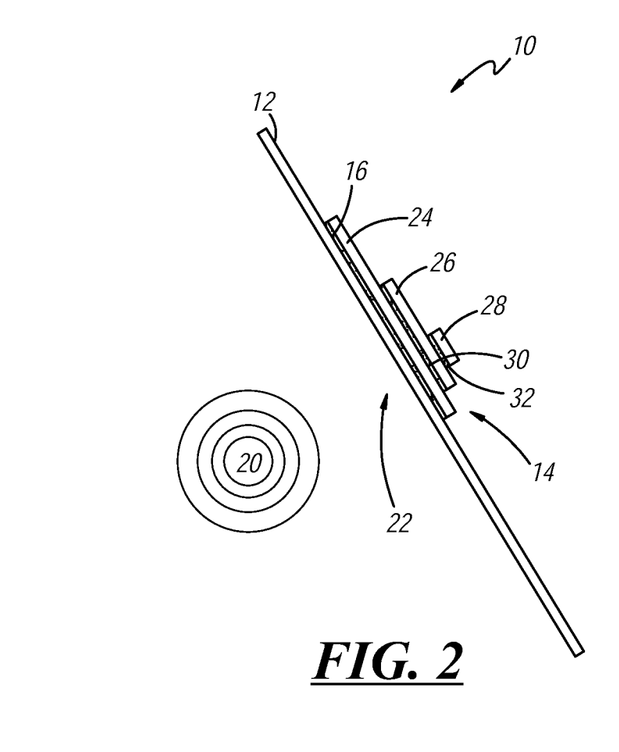
FIG. 2 is a side view of the panel assembly of FIG. 1.
Figure 3:
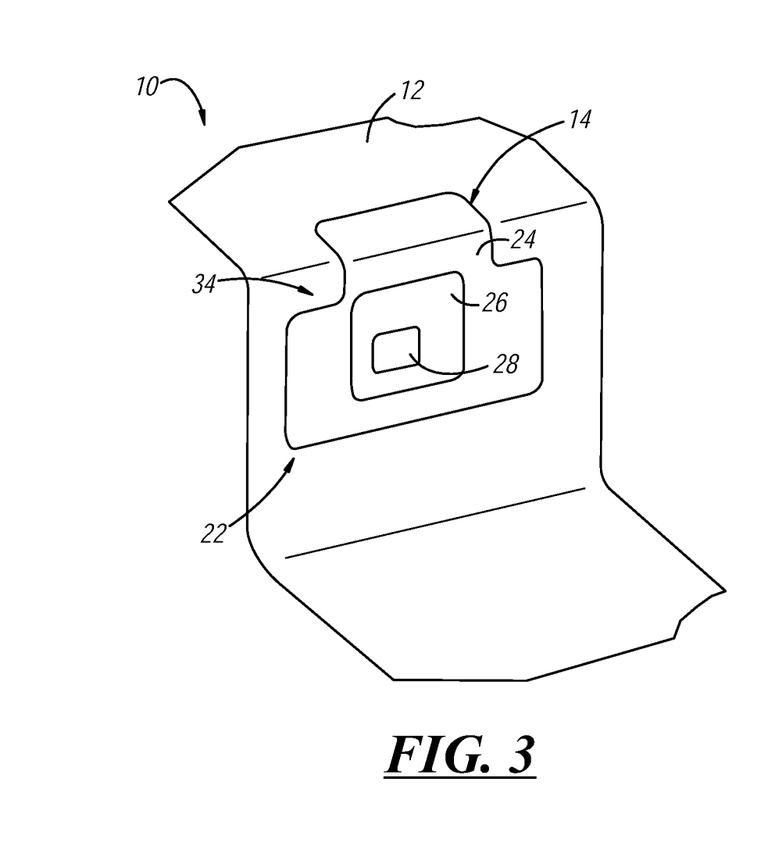
FIG. 3 is a perspective view of the panel assembly of FIG. 1 following one or more forming steps.

FIGS. 1-3 show a panel assembly 10 that generally includes a main panel 12, one or more multi-layer patches 14, and a primary adhesive layer 16 that attaches the main panel and the patches together. The term "panel assembly," as used herein, is not limited to any particular stage or phase of the manufacturing process, and may include: a panel assembly where the periphery of the panel has not yet been cut or trimmed to its final shape; a panel assembly where the periphery of the panel has already been cut or trimmed to its final shape; a panel assembly where the panel has not yet been stamped, bent or otherwise formed into its final contoured shape (e.g., the flat panel assembly in FIGS. 1 and 2); a panel assembly where the panel has already been stamped, bent or otherwise formed into its final contoured shape (e.g., the contoured panel assembly in FIG. 3); a panel assembly where the panel has not yet been attached to a vehicle or other structure; or a panel assembly where the panel has already been attached to a vehicle or other structure, such as in a vehicle dash panel or wheel well, to cite a few possibilities. The term "panel assembly" may refer to a partially, mostly or completely formed part.

Main panel 12 acts as the structural foundation for the underlying part or component being formed. Main panel 12 can be blanked, cut, sheared or otherwise formed into a desired shape. Main panel 12 is typically larger than multi-layer patch 14, and may be made from any number of suitable materials, including various types and alloys of steel (e.g., cold rolled steel, hot dipped steel, electro-galvanized steel, galvanneal, etc.), aluminum, other metals, or other non-metal materials such as polymer-based materials or composites. In certain exemplary embodiments, main panel 12 is made from steel and has a thickness between 0.4 mm-3.0 mm, inclusive; in other exemplary embodiments, main panel 12 is a multi-layer sound-damping laminate itself. The exact size, shape, thickness and composition of panel 12 are largely driven by the particular part that is being formed, and certainly may differ from the exemplary embodiments shown and described here.

Multi-layer patch 14, along with primary adhesive layer 16, may be strategically applied to main panel 12 to help reduce or mitigate the transmission of noise or vibrations through or along the panel assembly 10. Multi-layer patch 14 is typically attached to main panel 12 at a location that corresponds to an acoustically active region of the panel, such as region 22. An "acoustically active region," as used herein, broadly includes any section, portion and/or other region of the main panel that is exposed to a sound and/or vibration source and can benefit from some type of sound-damping. In the example shown in FIG. 2, region 22 is generally near and/or aligned with the noise or heat source 20. Some non-limiting examples of such sources 20 may include an engine, a wheel and tire assembly, an engine exhaust component, or a vehicle component that causes wind noise. The noise source may also be another noisy or vibrating vehicle component adjacent or attached to the panel assembly 10, and the location of region 22 may be dictated by other factors such as geometry, mass, or natural frequencies of the individual components, for example.

In the example shown in FIGS. 1 and 2, multi-layer patch 14 includes three individual patches 24, 26, 28 that are of differing size and shape and are attached to one another via two auxiliary adhesive layers 30, 32. The number of individual patches and/or auxiliary adhesive layers may differ from the exemplary embodiment shown here (e.g., there could be more or less patches, adhesive layers, etc.), but in most cases there will be at least two individual patches and at least one auxiliary adhesive layer. The total number of adhesive layers, including both the primary and auxiliary adhesive layers 16, 30, 32, is typically the same as the number of individual patches 24, 26, 28, but this is not necessarily the case. For example, a single adhesive layer may be used to directly attach more than one patch, as illustrated in the exemplary embodiments of FIGS. 4 and 5, which are subsequently described in more detail. As used herein, the term "attach" broadly includes any direct attachment or indirect attachment. For example, patch 24 is directly attached to main panel 12 by primary adhesive layer 16, while patch 28 is indirectly attached to main panel 12 via intervening patches 24, 26 and auxiliary adhesive layers 30, 32.

The size, shape and/or arrangement of the individual patches may vary according to the needs of the part being made. For example, in the embodiment shown in FIG. 1, individual patches 24, 26, 28 successively decrease in size so that patch 26 is completely located within the perimeter of patch 24, and patch 28 is completely located within the perimeter of patch 26. Put differently, patch 28 is smaller than and is circumscribed or encircled by the boundary of patch 26, and likewise patch 26 is smaller than and is circumscribed by the boundary of patch 24. In this particular example, each successive patch from the innermost patch 24 (i.e., the patch closest main panel 12) to the outermost patch 28 is smaller than the underlying patch to which it is attached. This is not always the case, however, as one or more of the patches may extend beyond the outer perimeter of an underlying patch, as illustrated in the exemplary embodiments of FIGS. 4 and 5. FIG. 5 also illustrates an example in which two separate patches may be directly attached to the main panel such that they are side-by-side or adjacent one another, with a third patch attached on top of them so that the top patch overlaps or spans the two underlying patches. These embodiments are subsequently described in more detail.

As noted above, the location of the individual patches may be influenced by the presence of acoustically active regions in the panel assembly, such as region 22 in FIG. 2. To illustrate, acoustically active region 22 may cover the entire main panel 12, or it may cover only portions or sections of the main panel. It is also possible for acoustically active region 22 to be subjected to various levels of sound and/or vibrations, with some sub-regions being exposed to higher levels than others. For example, an acoustically active region 22 may include various sub-regions, where each sub-region is affected by different levels of noise or vibration. In the absence of a sound-damping patch, for instance, a given sub-region may vibrate at higher amplitudes or at different frequencies than another sub-region. Multi-layer patch 14 may be configured and located so that the portions of the multi-layer patch having multiple, stacked layers overlie sub-regions on main panel 12 that are exposed to or experience higher levels of noise. Explained in the context of FIGS. 1 and 2, the portion of main panel 12 that lies directly beneath outermost patch 28, and therefore has three layers of sound-damping patches stacked over it, may be the portion of main panel 12 that is subjected to the highest noise, vibration, and/or heat. Each patch may work in conjunction with adjacent adhesive layers to mitigate noise so that areas of main panel 12 having multiple layers of patches dampen more sound than areas having only a single patch layer or no patch. Moreover, it is possible for the individual patches and/or the auxiliary adhesive layers to have different attributes that affect their damping performance as it relates to frequency, temperature, etc. Such exemplary embodiments are described below in greater detail.

The composition or material that the individual patches 24, 26, 28 are made of may vary according to the needs of the part being made. For instance, exemplary patches 24, 26, 28 may be constructed from any number of suitable materials, including various types and alloys of steel (e.g., cold rolled steel, hot dipped steel, electro-galvanized steel, galvanneal, etc.), aluminum, or other metals. In some embodiments, the patches may be constructed from non-metal materials such as rigid or semi-rigid polymer-based materials or composites. In one exemplary embodiment, each of the individual patches has the same thickness and all are thinner than that of the underlying main panel 12. The patch thickness may be between 0.2 mm-2.0 mm, inclusive, as an example. In other embodiments, each patch has a different thickness, or at least one patch has a different thickness than another patch. The same applies to the auxiliary adhesive layers 30, 32, as these layers can be made from similar or different compositions, have similar or different thicknesses, be applied using similar or different adhesive patterns, etc. This is discussed below in more detail. It is also possible for one or more of the individual patches of the multi-layer patch to be made from a laminate material; that is, an individual patch may itself include multiple metal layers adhered together with one or more adhesive layers, for example. In such a case, the different sub-layers of a laminate patch would generally have the same outer boundary or perimeter, as shown in the exemplary embodiment of FIG. 6, discussed in further detail below.

The individual patches 24, 26, 28 may include other features, such as features that assist with various types of metal forming operations. For instance, exemplary multi-layer patch 14 includes a forming feature in the form of a notch or cutout 34 that may be helpful during a stamping, drawing or other forming operation where the material near notch 34 undergoes significant deformation or lies in a complex stress region, as disclosed in previously incorporated patent application number PCT/US2010/053589. Of course, multi-layer patch 14 can include other useful features besides those that have the ability to dampen sound and vibrations. For instance, areas of panel assembly 10 that include multiple layers of patches may also represent areas of overall increased material thickness. Patch locations can thus be at least partially determined by the need to increase the stiffness and/or the heat resistance of particular areas of the panel 12. For example, it may be the case in some applications that no additional sound-damping is required in a particular region of panel 12 that already includes a sound-damping patch, but an additional overlying patch may be applied to increase the thermal resistance or R-value of the overall panel assembly 10 in that region. In some cases, a synergistic effect results where a multi-layer patch can provide additional stiffness and heat-resistance to a panel, while providing the additional benefit of noise-reduction. In one example, a panel assembly may include a protruding feature that extends toward a heat source and naturally amplifies noise due to its shape, thus determining the location of the multi-layer patch, as shown in the exemplary embodiment of FIG. 7, described in more detail below.

Adhesive layers 16, 30, 32 are used to adhere or otherwise attach the various layers of panel assembly 10 together. More particularly, referring again to FIGS. 1 and 2, innermost patch 24 is attached to main panel 12 with primary adhesive layer 16, intermediate patch 26 is attached to patch 24 with auxiliary adhesive layer 30, and outermost patch 28 is attached to patch 26 with auxiliary adhesive layer 32. The primary adhesive layer 16 bonds the multi-layer patch 14 to main panel 12, and auxiliary adhesive layers 30, 32 bond the various individual patches to one another. According to one exemplary embodiment, at least one of the adhesive layers 16, 30, or 32 is a viscoelastic adhesive layer that comprises an acrylate-based thermoset resin and has a thickness of about 0.005 mm to 0.05 mm, inclusive; however, other adhesive compositions and thicknesses may be used as well. It is possible for the different adhesive layers to vary from layer to layer, for example to tailor or control the sound-damping properties of each layer in terms of damping, temperature, frequency, etc., as is described below. Each adhesive layer 16, 30, 32 that is sandwiched between main panel 12 and a patch or sandwiched between individual patches may operate in a constrained damping layer capacity. Skilled artisans will appreciate that constrained damping layer constructions can dissipate or otherwise mitigate vibrational energy by utilizing shear and strain within the sandwich-like construction to convert vibrations into low-grade frictional heat. The multi-layer sound-damping patches 14 may utilize the adhesive layers in order to offer additional benefits and design flexibility.

For example, in one embodiment, at least one of adhesive layers 16, 30, or 32 is a sound-damping adhesive layer. In another embodiment, at least one of adhesive layers 16, 30, or 32 is a structural adhesive layer. Described broadly, any one of the adhesive layers included in panel assembly 10 may be different from any one of the other adhesive layers of the assembly. Adhesive layers are considered to be different from one another when they include different compositions, thicknesses, and/or material properties, for example. Some exemplary material properties include: sound damping performance as a function of temperature, frequency, etc.; thermal insulation; and cohesive strength or stiffness, to name a few. Each sound-damping adhesive layer may be characterized by an effective damping temperature range in which the adhesive layer functions together with a sound-damping patch to provide a maximum amount of sound-damping. In one embodiment, one adhesive layer has an effective damping temperature range that is higher than that of another adhesive layer, so that the overall effective damping temperature range of panel assembly 10 is greater. The use of multi-layer patches that include adhesive layers having different characteristics can be advantageous for broadening, customizing or tuning the operating properties of the panel assembly for the particular application in which it is to be used.

Consider the example where panel assembly 10 in FIG. 1 is exposed to a noise and heat source 20 that changes in temperature, such as a vehicle engine that warms up and cools down. Primary adhesive layer 16 may have a higher effective damping temperature range than that of auxiliary adhesive layers 30, 32, for instance. This may mean that adhesive layer 16 is more chemically stable and/or provides more effective sound-damping at higher temperatures than adhesive layers 30, 32. During periods of relatively low engine temperature, such as during an engine warm-up phase, the auxiliary adhesive layers 30, 32 may play a larger role in sound damping, as the current engine temperature is within their effective damping temperature range. Once the engine temperature reaches a normal operating level, primary adhesive layer 16 may perform more of the sound damping as the current engine temperature is now in the higher effective damping temperature range of layer 16. The effective damping temperature ranges of the different adhesive layers may overlap to provide an overall broader effective damping temperature range for panel assembly 10 than is traditionally available with single constrained-layer damping constructions. In a sense, the effective damping temperature ranges in this example are selected based on anticipated changes in temperature, as a function of time.

Figure 4:
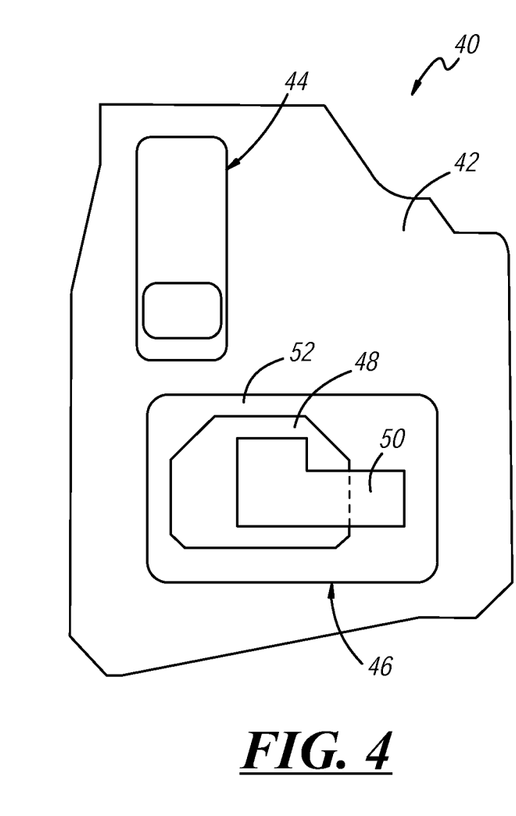
FIGS. 4 and 5 are top views of other exemplary panel assemblies that each includes several multi-layer patches.
Figure 5:
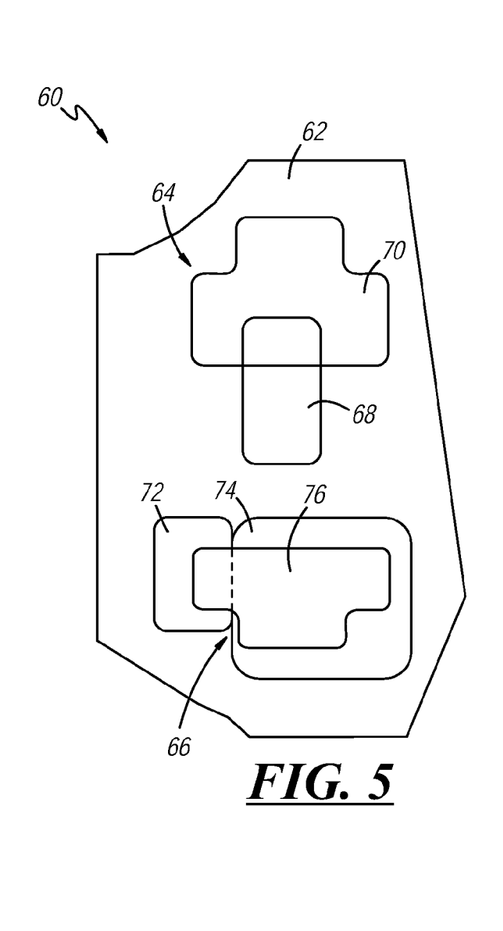

Consider a different example where panel assembly 40 in FIG. 4 is exposed to multiple noise and heat sources such that the panel has a non-uniform or heterogeneous temperature distribution. A first multi-layer patch 44 may be located near a first heat source and a second multi-layer patch 46 may be located near a second heat source. If the first heat source is expected to be hotter than the second heat source, for example, then one or more layers of the first multi-layer patch 44 may have a higher effective damping temperature range than one or more layers of the second multi-layer patch 46. Each of the multi-layer patches 44, 46 may also include adhesive layers having different temperature capabilities, as explained above. In a sense, the effective damping temperature ranges in this example are selected based on anticipated variations in temperature, as a function of location or position on the panel. Of course, two or more of the individual adhesive layers of the panel assembly may include the same composition, thickness, and/or material properties as well. For example, for any given multi-layer patch, two or more of the individual patches may be constructed from the same type and/or thickness of material while at least one of the adhesive layers differs from the others; two or more of the adhesive layers may include the same material composition and/or thickness while at least one of the individual patches differs from the others; or at least one of individual patches and at least one of the adhesive layers is different from the others, to cite several possibilities.

Another potential advantage afforded to the panel assembly by virtue of its multiple patches and multiple adhesive layers may be part formability. For example, having adhesive layers sandwiched between successive panel or patch layers can provide some level of compliance between opposing surfaces during forming when compared to a solid metal material of equal thickness. In other words, such opposing surfaces may be allowed to move relative to one another during forming, with the interposed adhesive layer absorbing or being subjected to some of the strain that would otherwise be applied to a solid metal panel and cause wrinkling or tearing. Additionally, providing constraining layers in the form of patches rather than full-laminates may allow the constraining layers to be custom-shaped to avoid known high stress or complex stress regions of the part to avoid wrinkling or other types of material failures during forming, as well as to reduce the weight and/or cost of the resulting part. Various forming features, like notch 34 in FIG. 1, may be used for this purpose, as already explained.

In some embodiments, additional attachment features such as spot welds 38 may be included to help attach one or more of the patches to underlying layers and/or to control material movement during subsequent metal forming processes. Such attachment features may be used near the outer perimeter or edge of any patch and may be useful to help maintain a patch in its desired location during a metal forming process. A variety of mastic and/or other non-adhesive sound-damping materials may be used in lieu of or in addition to the adhesive layers disclosed herein. Some non-limiting examples of such materials include pre-formed polymer foams, films, or mats that may be attached to adjacent patches or sandwiched between layers by non-adhesive means.

FIGS. 4-7 illustrate a number of exemplary embodiments of panel assemblies that include multi-layer patches. These examples are non-limiting and are briefly described below in order to illustrate some of the variety of configurations available where multi-layer patches are employed. FIG. 4 shows an exemplary panel assembly 40 having two multi-layer patches 44, 46, where patch 44 includes two individual patch layers and patch 46 includes three individual patch layers. Such a construction may be useful where main panel 42 is more acoustically active in the region of patch 46 that it is in the region of patch 44, requires more stiffness or structural reinforcement in that region, and/or experiences higher temperatures in that region. In one non-limiting example, panel assembly 40 may be placed near an exhaust system with patch 46 located near a noisier or higher temperature portion of the system than patch 44. Multi-layer patch 46 includes individual patches 48, 50, 52. As illustrated in FIG. 4, patch 48 is located completely within the periphery or boundary of patch 52, but patch 50 is not completely located within the periphery of underlying patch 48 and extends beyond its boundary.

In another embodiment, shown in FIG. 5, panel assembly 60 also includes two multi-layer patches 64, 66. Multi-layer patch 64 includes individual patches 68, 70 that partially overlap, similar to individual patches 48, 50 of FIG. 4. Multi-layer patch 64 is also an example where the underlying patch 68 is smaller than the overlying patch 70. This type of configuration may be useful where two different adhesive layers may be desired only in the overlapping area, to name just one example. Multi-layer patch 66 includes an outermost or topmost individual patch 76 partially overlapping two innermost patches 72, 74 that are arranged adjacent one another or side-by-side. Such an arrangement could be useful where the portion of the main panel 62 that underlies each of the individual patches 72, 74 has different performance requirements. For example, each individual patch 72, 74 may be configured to include different patch materials and/or thicknesses, different adhesive materials and/or thicknesses, or both, while the outermost patch may be applied to add additional sound, heat, or stiffness performance to its underlying region.

Figure 6:
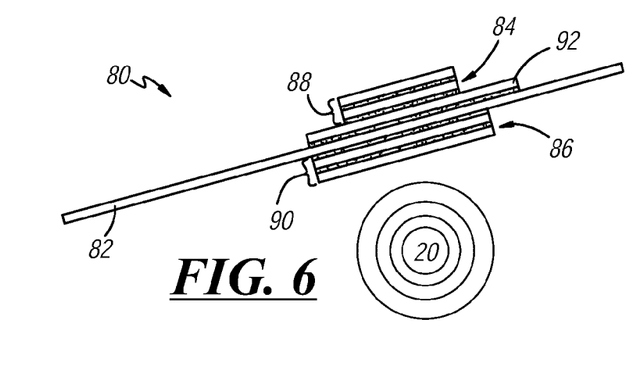
FIG. 6 is a side view of another exemplary panel assembly that includes multi-layer patches on both sides of a main panel.

The exemplary panel assembly 80 of FIG. 6 is shown arranged near a noise and/or heat source 20 and includes multi-layer patches 84, 86, each on opposite sides of a main panel 82. Such a construction may be useful where space or packaging constraints limit the number of patches that may overlie one another on either or both sides of the main panel 82, but a larger overall number of patches is desired in a particular location. In this particular example, each of the multi-layer patches 84, 86 respectively includes an individual patch 88, 90 that is itself a laminate. On the side of the panel nearest the source 20, the laminate patch 90 is the multi-layer patch 86, while multi-layer patch 84 includes a laminate patch 88 attached to a separate innermost patch 92. Laminate patches, in some cases, may offer ease of manufacturing where they can be cut or stamped from readily available full-laminate sound damping materials.

Figure 7:
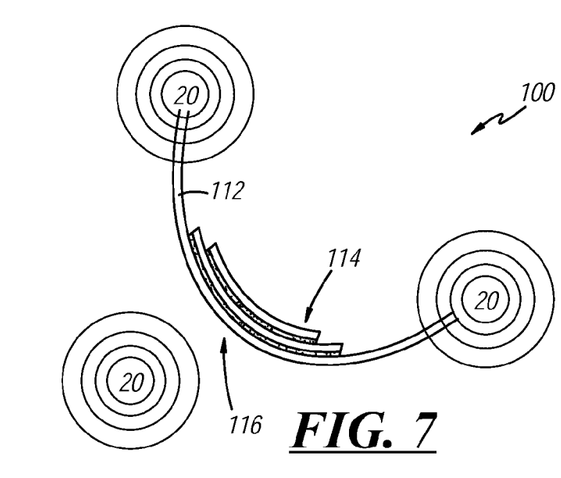
FIG. 7 is a side view of another exemplary panel assembly that is bent and includes a multi-layer patch on one side of a main panel.

FIG. 7 shows an exemplary panel assembly 100 with a multi-layer patch 114 attached to main panel 112. Panel assembly 100 is bent such that it is generally convex in shape in relation to source 20, which in this case represents a heat and/or noise source. Such rounded shapes, as well as other shapes having particular protrusions, geometries or other characteristics, may act as a heat and/or sound amplifier. For example, such a shape may direct or otherwise channel vibrations from other sources 20' toward a common apex or peak 116. In this example, apex 116 represents an acoustically active region and it is also the portion of the panel assembly nearest heat source 20. Multi-layer patch 114 may serve multiple purposes in such cases, acting as both a thermal insulator and as a sound damper, for example.

Figure 8:
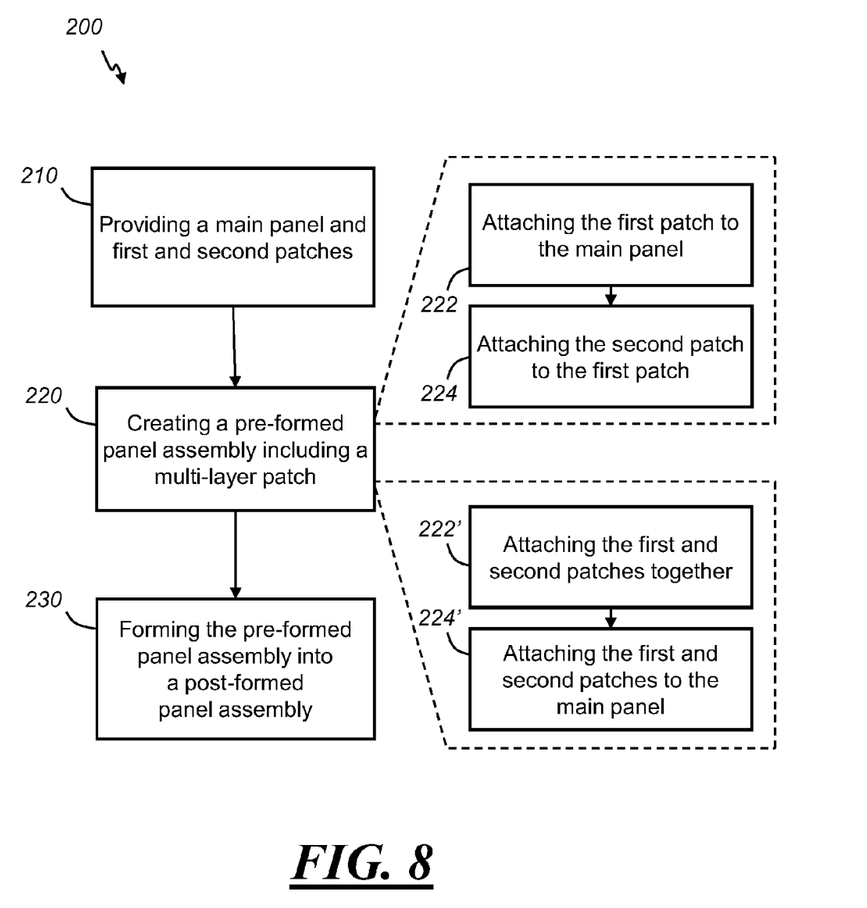
FIG. 8 is a flow chart illustrating some of the steps of an exemplary method for making a panel assembly that has one or more multi-layer patches.

Turning now to FIG. 8, there is shown an exemplary method 200 for making a panel assembly, such as those described above. Method 200 generally includes the steps of providing a main panel and two or more individual patches (step 210); creating a pre-formed panel assembly including a multi-layer patch (step 220); and forming the pre-formed panel assembly into a post-formed panel assembly (step 230). Other sequences and combinations of steps are certainly possible, as method 200 is only one exemplary embodiment.

Step 210 provides a main panel and two or more individual patches and may do so in any number of different ways. For instance, step 210 may use blanking, cutting, shearing and/or other known forming techniques to provide these individual components.

Step 220 uses the main panel and individual patches from the previous step to create a pre-formed panel assembly that includes a multi-layer patch. According to exemplary embodiment, sub-step 222 applies a primary adhesive layer to an inner surface of a first patch and/or an outer surface of a main panel (e.g., by spraying, roll coating, using a die-cut adhesive layer, etc.) and then cures the primary adhesive layer to adhere the first patch to the main panel. Sub-step 224 applies an auxiliary adhesive layer to an inner surface of a second individual patch and/or an outer surface of the first individual patch, and then cures the auxiliary adhesive layer to adhere the second and first individual patches together. Curing the primary and/or auxiliary adhesive layers may include subjecting them to elevated temperatures, radiation, particular wavelengths of light, gases such as oxygen or water vapor, or other types of curing initiators or facilitators to cross-link or otherwise cause an adhesive layer to become more solid or cohesive. The primary and auxiliary adhesive layers may be cured together or cured separately. Additional individual patches and/or adhesive layers may also be attached in this manner.

In a different embodiment, step 220 may pre-assemble two or more of the individual patches into a multi-layer patch and, once the pre-assembled multi-layer patch is finished, then attach it to the main panel. For instance, in sub-step 222' first and second patches may be adhered together with an auxiliary adhesive layer, and then in sub-step 224' the already combined or pre-assembled first and second patches are adhered to the main panel with a primary adhesive layer. Where more than two individual patches are provided, step 220 may blend steps from the two different embodiments described above. It is possible for this embodiment to use different curing techniques for the different adhesive layers; this can be particularly true due to the pre-assembled nature of the multi-layer patch. For example, the auxiliary adhesive layer(s) of the pre-assembled multi-layer patch could be cured at a first cure temperature before the patch is attached to a main panel, and then the primary adhesive layer could be cured at a second cure temperature when the pre-assembled multi-layer patch is attached to the main panel. If the auxiliary adhesive layer(s) require a lower cure temperature than the primary adhesive layer, for example, then the above-described embodiment could be used to cure all of the adhesive layers without subjecting the auxiliary adhesive layer(s) to the elevated cure temperature of the primary adhesive layer, and vice-versa. This technique may allow certain adhesive layers to endure multiple curing cycles, which oftentimes include elevated temperatures. Some types of adhesive layers do not require elevated temperatures for curing, and where these types of adhesive layers are employed, the order in which the panel and the individual patches are adhered to one another may be governed by other factors such as ease of manufacturing.

Step 230 takes the pre-formed panel assembly from the previous step and forms it into a post-formed panel assembly. This may be carried out using any conventional forming process such as bending, stamping, drawing, or other metal forming processes and may include forming all of the components and/or layers together or forming them separately and then attaching them to one another. As used herein, components referred to as being "formed together" includes components that are present in an assembly or sub-assembly and undergo a forming operation together; this does not necessarily mean that every component of the assembly or sub-assembly changes shape. For example, FIGS. 1 and 3 may represent a pre-formed panel assembly and a post-formed panel assembly, respectively. Though patches 26 and 28 do not change shape during forming step 230, they are considered to be formed together with the other components of the panel assembly.

It should be appreciated that method 200 may include a different combination and/or sequence of steps, including those that have greater or fewer steps than the exemplary embodiment described above. Additional patches and/or adhesive layers may also be used.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A panel assembly, comprising:
a main panel having an acoustically active region;
a primary adhesive layer; and
a multi-layer patch having at least two individual patches of different sizes and at least one auxiliary adhesive layer, wherein the primary adhesive layer attaches the multi-layer patch to the main panel at the acoustically active region for sound damping, and the auxiliary adhesive layer attaches a smaller one of the individual patches to a larger one of the individual patches such that only a portion of the larger individual patch is covered by the smaller individual patch, wherein the main panel is thicker than the individual patches of the multi-layer patch and acts as a structural foundation for the panel assembly so that the main panel, the primary adhesive layer, and the multi-layer patch can be formed together into a vehicle part during a metal forming operation.

2. The panel assembly of claim 1, wherein the main panel is comprised of steel or aluminum and has a thickness between 0.4 mm and 3.0 mm, inclusive.

3. The panel assembly of claim 1, wherein the main panel is comprised of a multi-layer sound-damping laminate.

4. The panel assembly of claim 1, wherein at least one of the individual patches is comprised of steel or aluminum and has a thickness that is less than the thickness of the main panel and is between 0.2 mm and 2.0 mm, inclusive.

5. The panel assembly of claim 1, wherein at least one of the individual patches is comprised of a multi-layer sound-damping laminate.

6. The panel assembly of claim 1, wherein at least one of the primary or auxiliary adhesive layers is comprised of an acrylate-based thermoset resin and has a thickness between 0.005 mm and 0.05 mm, inclusive.

7. The panel assembly of claim 1, wherein the multi-layer patch includes first and second individual patches and the auxiliary adhesive layer, and the primary adhesive layer attaches the first individual patch to the main panel at the acoustically active area and the auxiliary adhesive layer attaches the second individual patch to the first individual patch.

8. The panel assembly of claim 7, wherein the first and second individual patches are a different size, and the first individual patch is smaller than the main panel and is located completely within the boundary of the main panel and the second individual patch is smaller than the first individual patch and is located completely within the boundary of the first individual patch.

9. The panel assembly of claim 7, wherein the first and second individual patches are a different size, and the first individual patch is smaller than the main panel and is located completely within the boundary of the main panel and the second individual patch overlaps the first individual patch so that it is not located completely within its boundary.

10. The panel assembly of claim 7, wherein the multi-layer patch includes first, second and third individual patches and first and second auxiliary adhesive layers, the primary adhesive layer attaches the first individual patch to the main panel, the first auxiliary adhesive layer attaches the second individual patch to the first individual patch, and the second auxiliary adhesive layer attaches the third individual patch to the second individual patch so that stacked layers are formed that include the main panel and all three individual patches.

11. The panel assembly of claim 7, wherein the multi-layer patch includes first, second and third individual patches and the auxiliary adhesive layer, one or more primary adhesive layers attach the first and second individual patches to the main panel, and the auxiliary adhesive layer overlappingly attaches the third individual patch to the first and second individual patches so that stacked layers are formed that include the main panel and two of the three individual patches.

12. The panel assembly of claim 1, wherein at least one of the individual patches includes a forming feature in the form of a notch or a cutout that is located in a complex stress region of the panel assembly and assists with material flow during a metal forming operation.

13. The panel assembly of claim 1, wherein the primary adhesive layer has a first effective damping temperature range and the auxiliary adhesive layer has a second effective damping temperature range that is different than the first effective temperature range, and the overall effective damping temperature range of the panel assembly is broader than is the effective damping temperature range of any one adhesive layer.

14. The panel assembly of claim 1, wherein the multi-layer patch includes a plurality of spot welds that help attach one or more of the individual patches to underlying layers.

15. The panel assembly of claim 14, wherein the plurality of spot welds are located near an outer perimeter of at least one of the individual patches and assist with maintaining the individual patch in a desired location during a metal forming operation.

16. The panel assembly of claim 1, wherein a portion of the main panel is bent into a generally concave or convex shape that acts as a sound amplifier, and the multi-layer patch is attached to the main panel at the concave or convex shape.

17. The panel assembly of claim 1, wherein the panel assembly includes first and second multi-layer patches that are separate from one another, the first multi-layer patch is attached to the main panel at an acoustically active region that is subject to greater acoustic energy than is the second multi-layer patch, and the first multi-layer patch has more individual patches and auxiliary adhesive layers than the second multi-layer patch so that the first multi-layer patch can provide greater sound damping than the second multi-layer patch.

18. The panel assembly of claim 1, wherein the panel assembly includes first and second multi-layer patches that are separate from one another, the first multi-layer patch is attached to the main panel at an acoustically active region that is subject to a wider temperature range than is the second multi-layer patch, and the first multi-layer patch has more individual patches and auxiliary adhesive layers than the second multi-layer patch so that the first multi-layer patch can provide sound damping over a wider temperature range than the second multi-layer patch.

19. The panel assembly of claim 1, wherein the panel assembly includes first and second multi-layer patches that are separate from one another, the first multi-layer patch is attached to a first side of the main panel at an acoustically active region, and the second multi-layer patch is attached to a second opposite side of the main panel at an acoustically active region.

20. The panel assembly of claim 1, wherein the main panel and the multi-layer patch are both comprised of metal and the vehicle part is selected from the list of: a wheel well, a seat tub, a spare wheel tub, a dash panel, a plenum, a cowl, a roof panel, a floor pan, a hood, a deck lid, a door inner, a parcel shelf, an oil pan, or a cover or housing for an engine or transmission component.

21. A method of making a panel assembly, comprising the steps of:
(a) providing a main panel, a first individual patch, and a second individual patch that is smaller than the first individual patch;
(b) attaching the first individual patch to the main panel via a primary adhesive layer and attaching the smaller second individual patch to the first individual patch via an auxiliary adhesive layer so that a flat pre-formed panel assembly is formed where only a portion of the first individual patch is covered by the smaller second individual patch; and
(c) subjecting the pre-formed panel assembly to a metal forming operation so that the main panel, the first individual patch, the second individual patch, the primary adhesive layer and the auxiliary adhesive layer are formed together into a post-formed panel assembly.

22. A panel assembly, comprising:
a main metal panel;
a primary viscoelastic adhesive layer; and
a multi-layer metal patch having at least two individual metal patches and at least one auxiliary viscoelastic adhesive layer, wherein the primary viscoelastic adhesive layer attaches the multi-layer metal patch to the main metal panel at the acoustically active region for sound damping, and the auxiliary viscoelastic adhesive layer attaches an outer one of the individual metal patches to an inner one of the individual metal patches such that a stacked layer profile of the multi-layer metal patch has a plurality of areas of overall increased material thickness, and at least two of the areas of overall increased material thickness have a different shape.

* * * * *